(12) United States Patent
Mandryk et al.

(10) Patent No.: US 9,977,268 B2
(45) Date of Patent: May 22, 2018

(54) OPTICAL TUNING SYSTEM AND METHOD

(71) Applicant: THE UNIVERSITY OF SYDNEY, Sydney, New South Wales (AU)

(72) Inventors: Jeffrey Mandryk, Sydney (AU); Xiaoke Yi, Sydney (AU); Anish Lamichhane, Sydney (AU)

(73) Assignee: The University of Sydney, Sydney (AU)

(*) Notice: Subject to any disclaimer, the term of this patent is extended or adjusted under 35 U.S.C. 154(b) by 0 days. days.

(21) Appl. No.: 15/523,084

(22) PCT Filed: Oct. 30, 2015

(86) PCT No.: PCT/AU2015/050684
§ 371 (c)(1),
(2) Date: Apr. 28, 2017

(87) PCT Pub. No.: WO2016/065428
PCT Pub. Date: May 6, 2016

(65) Prior Publication Data
US 2017/0329159 A1    Nov. 16, 2017

(30) Foreign Application Priority Data

Oct. 30, 2014 (AU) .................................. 2014904359

(51) Int. Cl.
*G02F 1/01* (2006.01)
*G02F 1/025* (2006.01)
(Continued)

(52) U.S. Cl.
CPC ............ *G02F 1/025* (2013.01); *G02F 1/0121* (2013.01); *G02F 1/0126* (2013.01); *H01S 3/094* (2013.01);
(Continued)

(58) Field of Classification Search
CPC ....................... G02F 1/0121; G02F 2001/0151
See application file for complete search history.

(56) References Cited

U.S. PATENT DOCUMENTS 5,058,974 A * 10/1991 Mollenauer .......... H04B 10/291
359/334
6,407,853 B1 * 6/2002 Samson ............ H01S 3/094003
359/337

(Continued)

FOREIGN PATENT DOCUMENTS

WO    WO2012/173620    12/2012
WO    WO2013/188914    12/2013

OTHER PUBLICATIONS

PCT Search Report and Written Opinion for PCT/AU2015/050684, completed Feb. 2, 2016.
(Continued)

*Primary Examiner* — Sung Pak
(74) *Attorney, Agent, or Firm* — Barnes & Thornburg LLP

(57) ABSTRACT

An optical processing system providing a rapid optical response, the system including: a first optical material sensitive to an effective refractive index change under photon absorption; a first optical pump for optically pumping the first optical material at a first frequency so as to cause the first optical material to undergo an effective refractive index change by means of photon absorption; a second optical pump for optically pumping the first optical material at a second frequency so as to cause the first optical material to undergo a rapid second refractive index change by means of stimulated emission.

13 Claims, 19 Drawing Sheets

(51) Int. Cl.
*H01S 3/094* (2006.01)
*G02F 1/015* (2006.01)

(52) U.S. Cl.
CPC .. *G02F 2001/0151* (2013.01); *G02F 2203/15* (2013.01)

(56) References Cited

U.S. PATENT DOCUMENTS

| | | | |
|---|---|---|---|
| 8,542,713 B2* | 9/2013 | Nebel | H01S 3/09415 372/71 |
| 2002/0131694 A1 | 9/2002 | So et al. | |
| 2008/0123701 A1 | 5/2008 | He | |
| 2010/0118375 A1* | 5/2010 | Maleki | G01R 29/0885 359/239 |
| 2012/0194893 A1* | 8/2012 | Maleki | G02F 2/02 359/246 |
| 2014/0247853 A1* | 9/2014 | Deppe | H01S 5/18308 372/50.11 |
| 2016/0109731 A1* | 4/2016 | Huang | G02F 1/015 385/3 |

OTHER PUBLICATIONS

Manolatou, Christina, et al., "All-Optical Silicon Modulators Based on Carrier Injection by Two-Photon Absorption," Mar. 2006, Journal of Lightwave Technology, vol. 24, No. 3, pp. 1433-1439.

\* cited by examiner

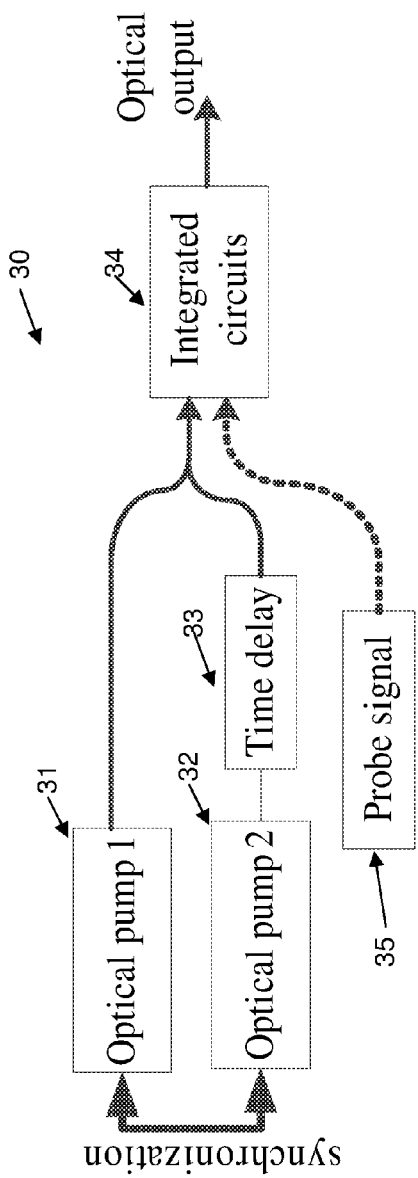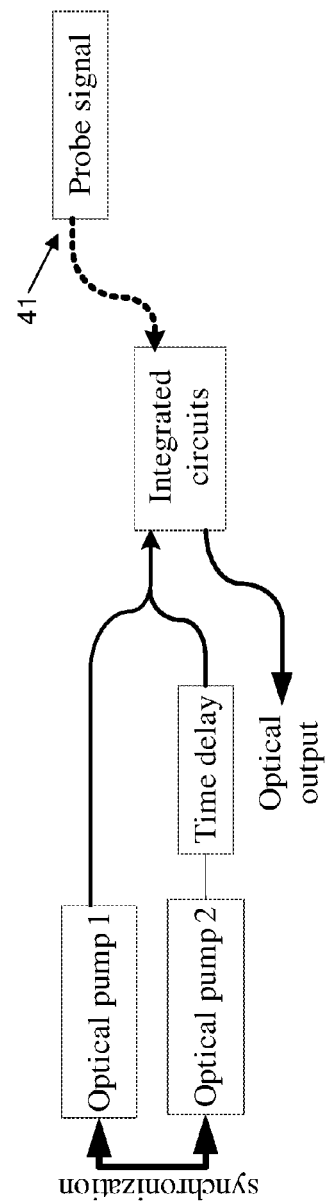
FIG. 3
FIG. 4

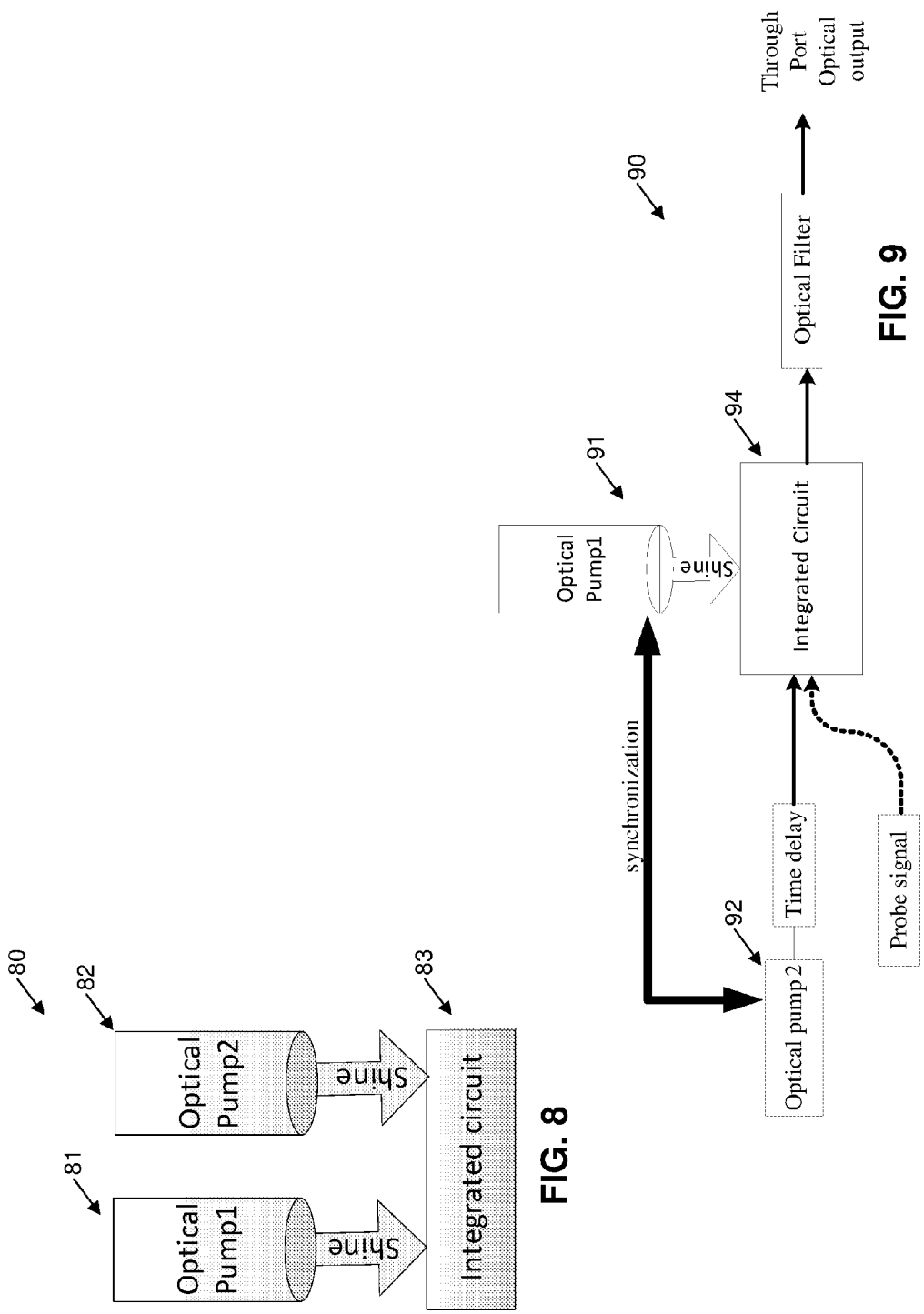

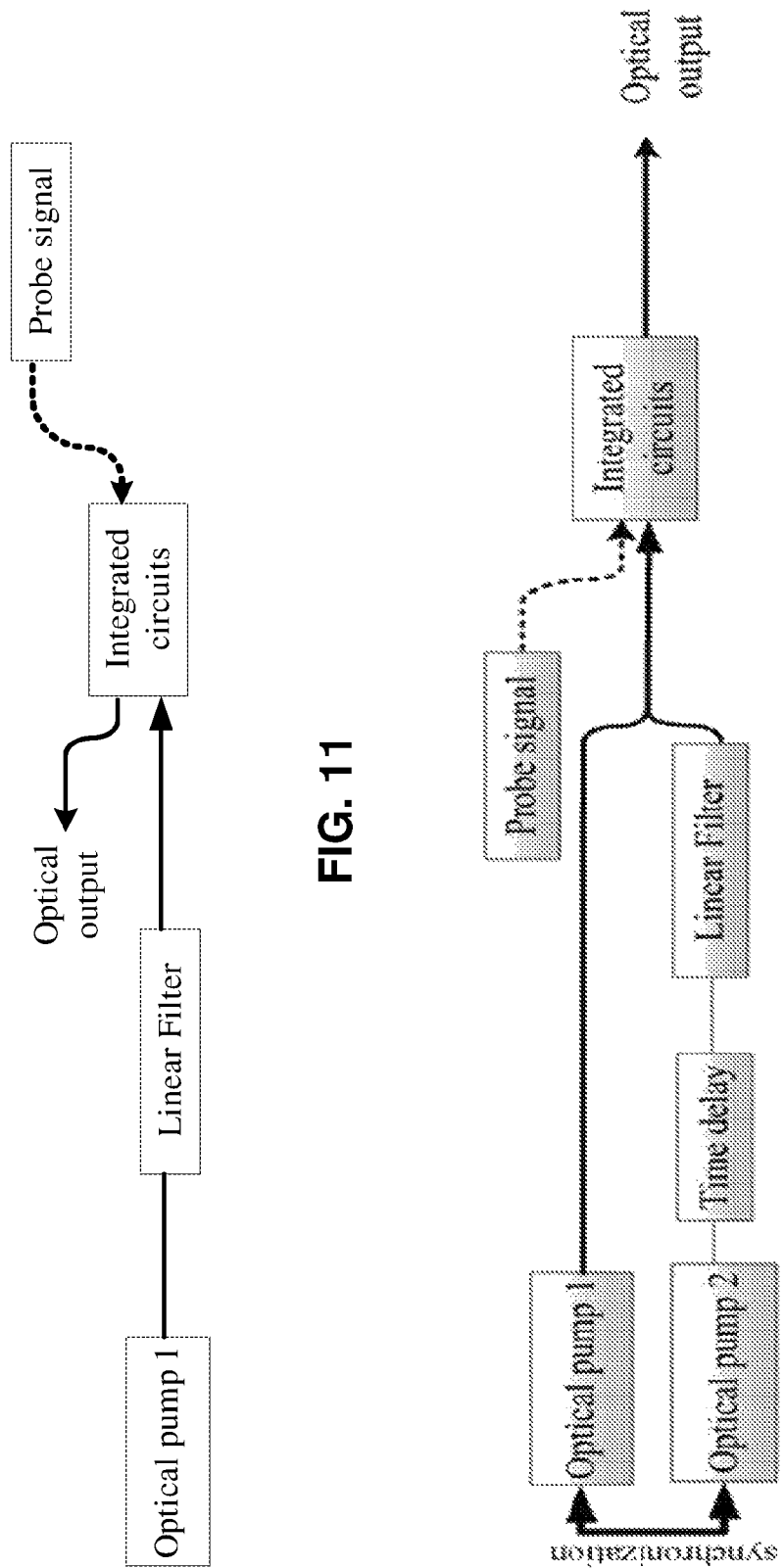

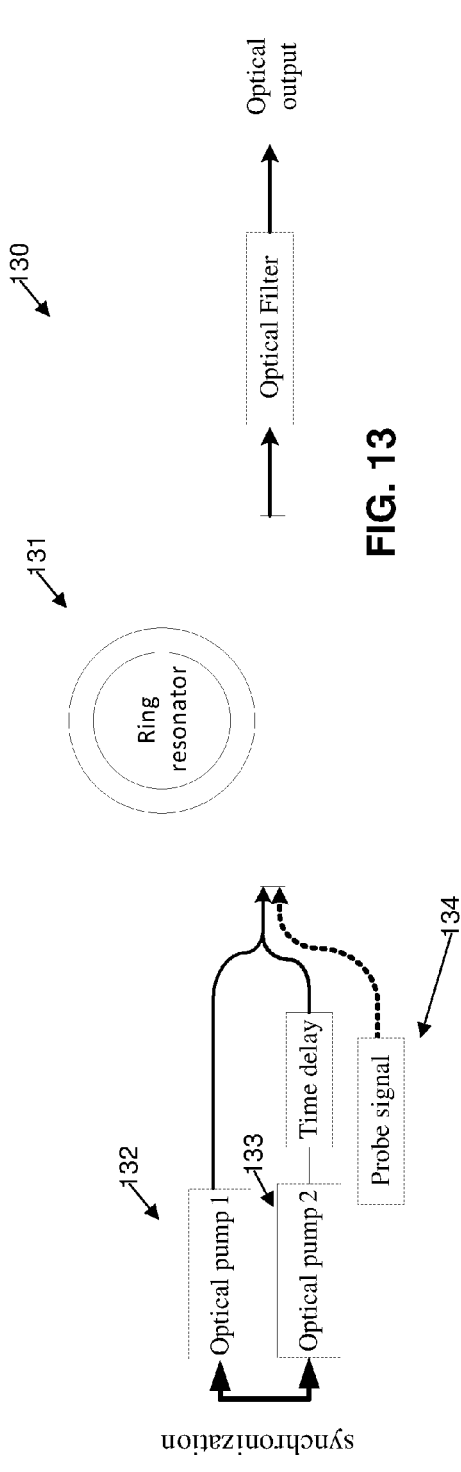
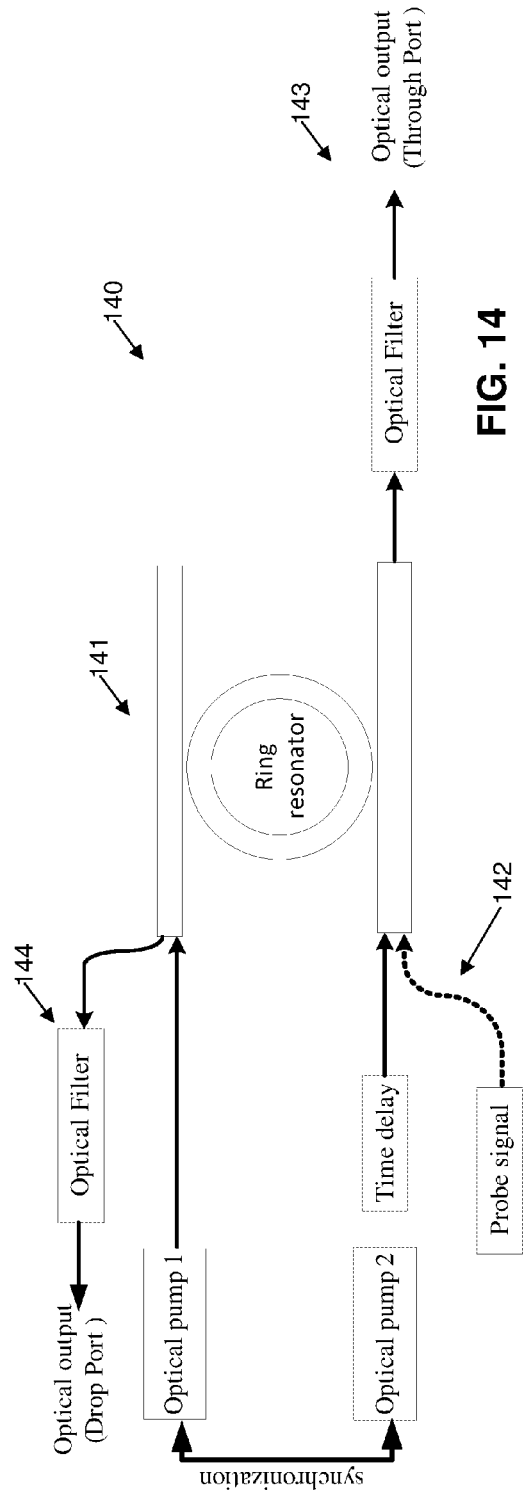

OPTICAL TUNING SYSTEM AND METHOD

CROSS-REFERENCE TO RELATED APPLICATIONS

The present application is the U.S. national phase of PCT/AU2015/050684, filed on Oct. 30, 2015. PCT/AU2015/050684 claims priority to Australian Patent Application Serial No. 2014904359, entitled "OPTICAL TUNING SYSTEM AND METHOD," which was filed on Oct. 30, 2014, the entirety of each of which is hereby incorporated by reference.

FIELD OF THE INVENTION

The present invention relates to the field of high speed optical tuning, and, in particular, discloses a high speed pumping system for an optical device.

REFERENCES

[1] X. Y. Tong Chen, Thomas Huang, and Robert A. Minasian, "Multiple-bipolar-tap tunable spectrum sliced microwave photonic filter," *Optics Letters*, vol. 35, pp. 3934-3936 2010.
[2] M. Lipson, "Guiding, modulating, and emitting light on Silicon-challenges and opportunities," *Lightwave Technology, Journal of*, vol. 23, pp. 4222-4238, 2005.
[3] D. F. Qianfan Xu, and Raymond G. Beausoleil, "Silicon micro ring resonators with 1.5-μm radius," *Optics Express*, vol. 16, pp. 4309-4315, 2008.
[4] P. D. H. Wim Bogaerts, Thomas Van Vaserenbergh, Katrien De Vos, Shankar Kumar Selvaraja, Tom Claes, Pieter Dumon, Peter Bienstman, Dries Van Thourhout, Rod Baets, "Silicon Microring Resonators," *Laser Photonics Review*, Rev 6, pp. 47-73, 2012.
[5] C. Manolatou and M. Lipson, "All-optical silicon modulators based on carrier injection by two-photon absorption," *Lightwave Technology, Journal of*, vol. 24, pp. 1433-1439, 2006.
[6] M. H. K. Hao Shen, Li Fan, Lin Zhao, Yi Xuan, Jing Ouyang, Leo T. Varghese, and Minghao Qi, "Eight-channel reconfigurable microring filters with tunable frequency, extinction ratio and bandwidth," *Optics Express*, vol. 18, pp. 18067-18076, 2010.
[7] Q. S. Xu, Bradley; Pradhan, Sameer; Lipson, Michal, "Micrometer-scale silicon electro-optic modulator," *Nature Publishing Group*, vol. 435, pp. 325-7, 2005.
[8] T. A. Ibrahim, W. Cao, Y. Kim, J. Li, J. Goldhar, P. T. Ho, et al., "All-optical switching in a laterally coupled microring resonator by carrier injection," *Photonics Technology Letters, IEEE*, vol. 15, pp. 36-38, 2003.
[9] G. V. William S. Fegadolli, Xuan Wang, Felipe Valini, Luis A. M. Barea, José E. B. Oliveira, Newton Frateschi, Axel Scherer, Vilson R. Almeida, and Roberto R. Panepucci, "Reconfigurable silicon thermo-optical ring resonator switch based on Vernier effect control," *Optics Express*, vol. 20, pp. 14722-14733, 2012.
[10] Z. Xiaoliang, M. Wang, K. Bergman, H. L. R. Lira, L. Lian-Wee, and M. Lipson, "FPGA controlled microring based tunable add-drop filter," in *Optical Interconnects Conference*, 2013 IEEE, 2013, pp. 102-103.
[11] V. R. B. Almeida, Carlos A; Panepucci, Roberto R; Lipson, Michal, "All-optical control of light on silicon chip," *Nature Publishing Group*, vol. 431, pp. 1081-1084, 2004.

BACKGROUND

Any discussion of the background art throughout the specification should in no way be considered as an admission that such art is widely known or forms part of common general knowledge in the field.

All optical signal processing has the benefit of encompassing a large bandwidth, being low loss and immune to electromagnetic interference [1]. Current solutions to realize all optical signal processors count on the ability to optically tune devices such as phase shifters, modulators, delay lines, filters or switches. It is a current trend to manufacture these devices based on silicon photonics to establish integrated circuits compatible with current CMOS technology [2]. Photonic circuitry based on silicon optical waveguides offers advantages such as small physical footprint [3], high light confinement factor [4], low radiation propagation losses [4], and being compatible with current CMOS microchips and fabrication processes.

The process of tuning silicon based photonic integrated circuits can be achieved by exciting free carriers in the silicon waveguide. Changes to the free carrier concentration result in changing in the materials refractive index, and consequently, changes the optical path length of the light as it travels through the waveguide. However, a weak refractive index dependence on the free carrier concentration in silicon renders tuning difficult [5], and has typically required large amounts of power in order to excite enough carriers to achieve the desired refractive index change. This problem can be abated by using a ring resonator structure, which is characterised by strong light confinement and strong wavelength dependence on the transmission spectrum [5]. For example, due to these factors, a change of $10^{-3}$ in the refractive is enough to achieve an 80% decrease in the output optical intensity using the design proposed in [5]. Changing the free carrier concentration of the ring resonator has the effect of shifting the frequency spectrum, and hence, changes the resonate wavelengths. Various methods have been presented to achieve controlled tunability in ring resonator based integrated photonic circuits including micro-heaters [6], PN-junction [7], or an optical pump [8]. These methods are discussed as follows:

Micro-Heaters Based Tuning:

Micro-heaters are placed at discrete locations above or around each of the ring resonators. As current is passed to the heaters, heat is transferred to the ring resonators, causing the excitation of free carriers [9]. The switching time of this method is slow, in the order of microseconds [6]. Faster tuning performances can be achieved by using a field-programmable gate array controller to control the magnitude of current passed to the heaters [10]. Rise times of 4 μs, followed by fall times of 30 μs can be achieved.

Single Optical Pump Based Tuning:

An optical pump pulse laser source is used to excite free carriers via an absorption process. The optical pump source is either coupled to the ring evanescently by directing it along an input waveguide [8] or by positioning the source above the integrated circuit, and directly illuminating the ring resonator [11]. Both methods are effective at exciting free carriers, with rise times as fast as 1 ps being experimentally achieved [11]. However, the fall time of the tuning method is limited to 400 ps [5], as a result of lengthy free carrier lifetimes. This limits the overall tuning performance. Reducing the free carrier lifetime would offer the advantage of speeding up the fall times of the device and improve the tuning performance. Current methods of achieving this including shrinking the cavity size, manipulating surface passivation and ion implantation [5]. Using these techniques, a fall time as fast as 100 ps has been achieved [5], which is still inferior when compared to the rise time performance.

PN Junctions Based Tuning:

Surrounding the ring resonator with highly doped p- and n-regions and applying bias voltage across the junction can provide tunability of ring resonators [7]. When a forward bias voltage is applied, it will excite electrons to their higher energy levels, while a reverse bias voltage stimulates the decay of electrons to their original lower energy state. The tuning performance of the above design is dependent on the input bias voltage. Using a peak to peak voltage bias of 3.3V (−1.85V to +1.45V), experimental results show a rise time of 10 ns and fall times of 1.5 ns [7]. Increasing the peak to peak voltage to 6.9V (−2.8V to +4.1V) yields an improvement in the tuning performance, with the design achieving a rise time of 200 ps and a fall time of 150 ps [7].

It can be seen therefore that the performance of microheater based tuning is limited by slow thermal dynamics, and the usage of PN-junctions is inefficient in injecting free carriers. Moreover, both techniques lack the capability of remote control. The usage of an external optical pump to stimulate carrier injection to change the material properties of the device provides the possibility of achieving tunability via remote control. However, the tuning speed of this approach is fundamentally limited by the lengthy free carrier lifetime.

SUMMARY OF THE INVENTION

It is an object of the invention, in its preferred form to provide an improved form of rapid optical tuning of optical circuits.

In accordance with a first aspect of the present invention, there is provided an optical processing system providing a rapid optical response, the system including: a first optical material sensitive to an effective refractive index change under photon absorption; a first optical pump for optically pumping the first optical material at a first frequency so as to cause the first optical material to undergo an effective refractive index change by means of photon absorption; a second optical pump for optically pumping the first optical material at a second frequency so as to cause the first optical material to undergo a rapid second effective refractive index change by means of stimulated emission.

The first optical material can form part of an integrated circuit such as a microring resonator and the optical pumps can act to control the resonant frequencies of operation of the microring resonator.

In some embodiments, there can further be provided an optical probe signal input, input to the first optical material, with the first optical material acting to filter the optical probe signal input to produce an optical output signal.

In some embodiments, at least one of the optical pumps can be interconnected to the optical material by means of a waveguide. In some embodiments, at least one of the optical pumps projects its optical output to the optical material by means of free space projection. In some embodiments, the output of at least one of the optical pumps undergoes intermediate frequency conversion before being projected through the first optical material. The output of at least one of the output pumps can be filtered before being projected through the first optical material.

In some embodiments, the pump decay of the second optical pump can be modulated to increase the speed of stimulated emission. This can be provided by the length of the pump decay being increased. The first and second optical pump can be connected to a relative delay element so as to provide a fixed delay between the first and second pumping. The relative delay element comprises a fiber bragg grating.

In accordance with a further aspect of the present invention, there is provided a method of controlling the rate response of an optically tuned system, the method including the steps of: (a) providing a first optical material sensitive to an effective refractive index change under stimulated emission; (b) pumping the first optical material with a first pump frequency to induce an effective refractive index change due to optical absorption; (c) pumping the first optical material with a second pump frequency to induce a rapid change in the effective refractive index of the first optical material by stimulated emission.

The method can further include the step of: (d) projecting an optical probe signal through the first optical material, and the first optical material acting to filter the optical probe signal in accordance with a current refractive index state of the optical material.

BRIEF DESCRIPTION OF THE DRAWINGS

Embodiments of the invention will now be described, by way of example only, with reference to the accompanying drawings in which:

FIG. 3 illustrates schematically a Unidirectional Waveguide Pumping Scheme with Unidirectional Probe Signal;

FIG. 4 illustrates schematically a Unidirectional Waveguide Pumping Scheme with a Probe;

FIG. 8 further illustrates schematically an alternative waveguide pumping control scheme;

FIG. 9 illustrates schematically a Combination of Waveguide and Illumination Pumping Scheme;

FIG. 11 illustrates schematically a Single Pump Pulse Modulation Scheme;

FIG. 12 illustrates schematically a Dual Pump Pulse Modulation Scheme;

FIG. 13 illustrates schematically a Ring Resonator Based All Optical Modulator;

FIG. 14 illustrates schematically a Ring Resonator Based All Optical Switch;

DETAILED DESCRIPTION

The preferred embodiments seek to overcome timing limitations by means of applying pump control techniques to stimulate the decay of the free carriers, and thus reducing the limiting performance factor. Some embodiments further allow for complete remote access/control of the device via optical fibre, with no need for localised power supplies or controlling circuitry.

Figure 1:
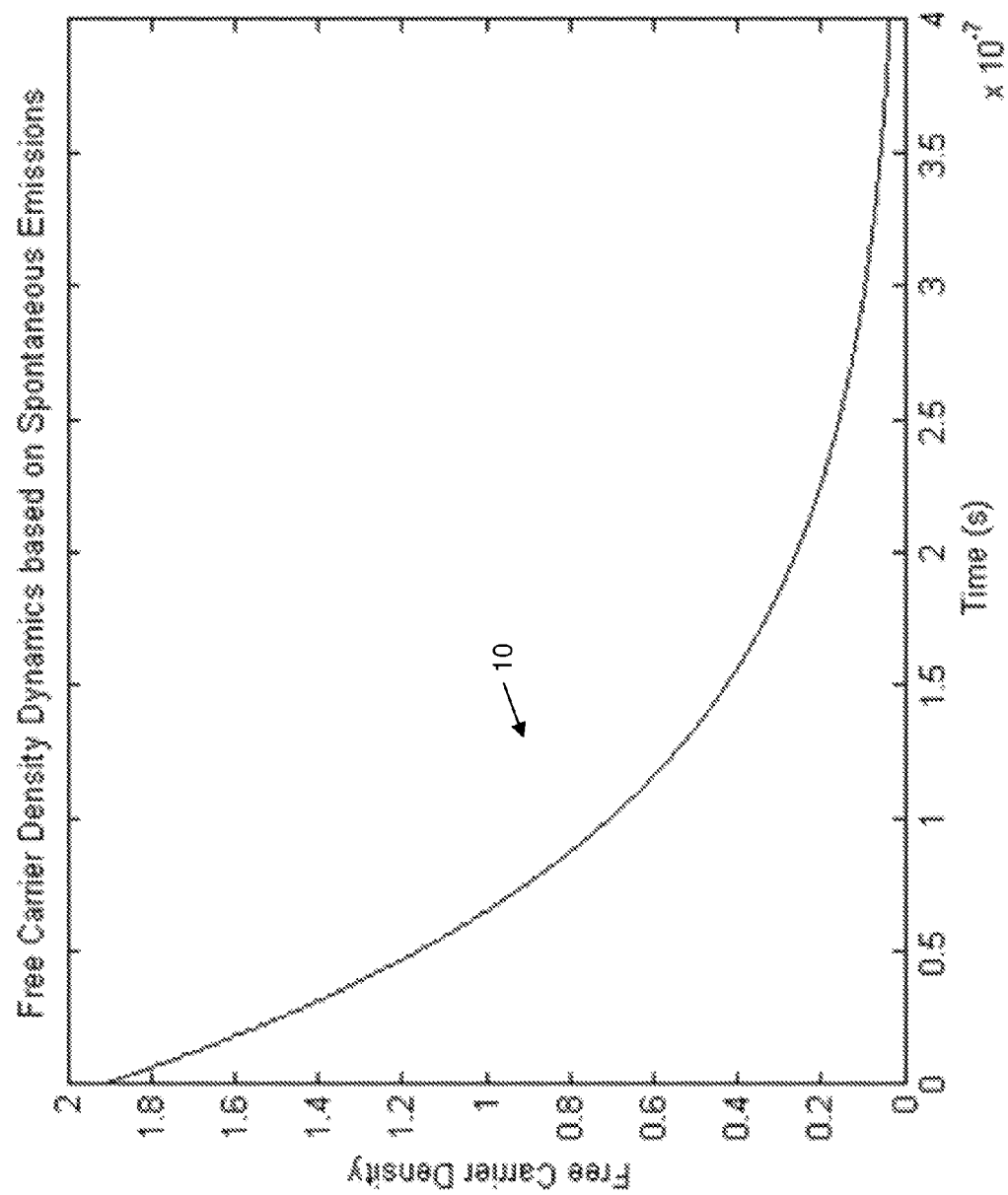
FIG. 1 illustrates a graph of the free carrier density variation occurring due to spontaneous emissions.

Modelling the proposed design requires solving the stimulated and spontaneous emission rate equations. The model is based on assuming a second pump can only cause stimulated emissions and no absorption. This simplification is substantially valid for silicon as the absorption process would require the absorption of a phonon which not very probable if the pump energy is close to the band gap energy. The spontaneous rate equation is given by $$\frac{dN(t)}{dt} = -A_{21} \times N(t)$$

where $A_{21}$ is the Einstein A coefficient and equals to the reciprocal of the carrier life time, and N(t) is the free carrier density. Solving the above differential equation yields the following result:

$$N(t) = N(0) \times e^{-A_{21}t}$$

where N(0) is the initial free carrier density. FIG. 1 shows example carrier density decay dynamics 10 by assuming an initial carrier density of 1.92 a.u, and a carrier lifetime of 100 ns.

The stimulated rate equation is given by the following formula:

$$\frac{dN(t)}{dt} = -B_{21} \times p(v) \times N(t)$$

where p(v) is the energy density, defined as the intensity of the optical source divided by the speed of light, the intensity is defined as the pump power divided by the cross section waveguide area, and $B_{21}$ is the Einstein B Coefficient, which is expressed as:

$$B_{21} = \frac{\pi |p|^2}{3\varepsilon_0 h^2}$$

where p is the electric dipole moment, $\varepsilon_0$ is the permittivity of free space, and h is Planks constant. Solving the above differential equation yields the following result:

$$N(t) = N(0) \times e^{-B_{21} p(v) t}$$

Figure 2:
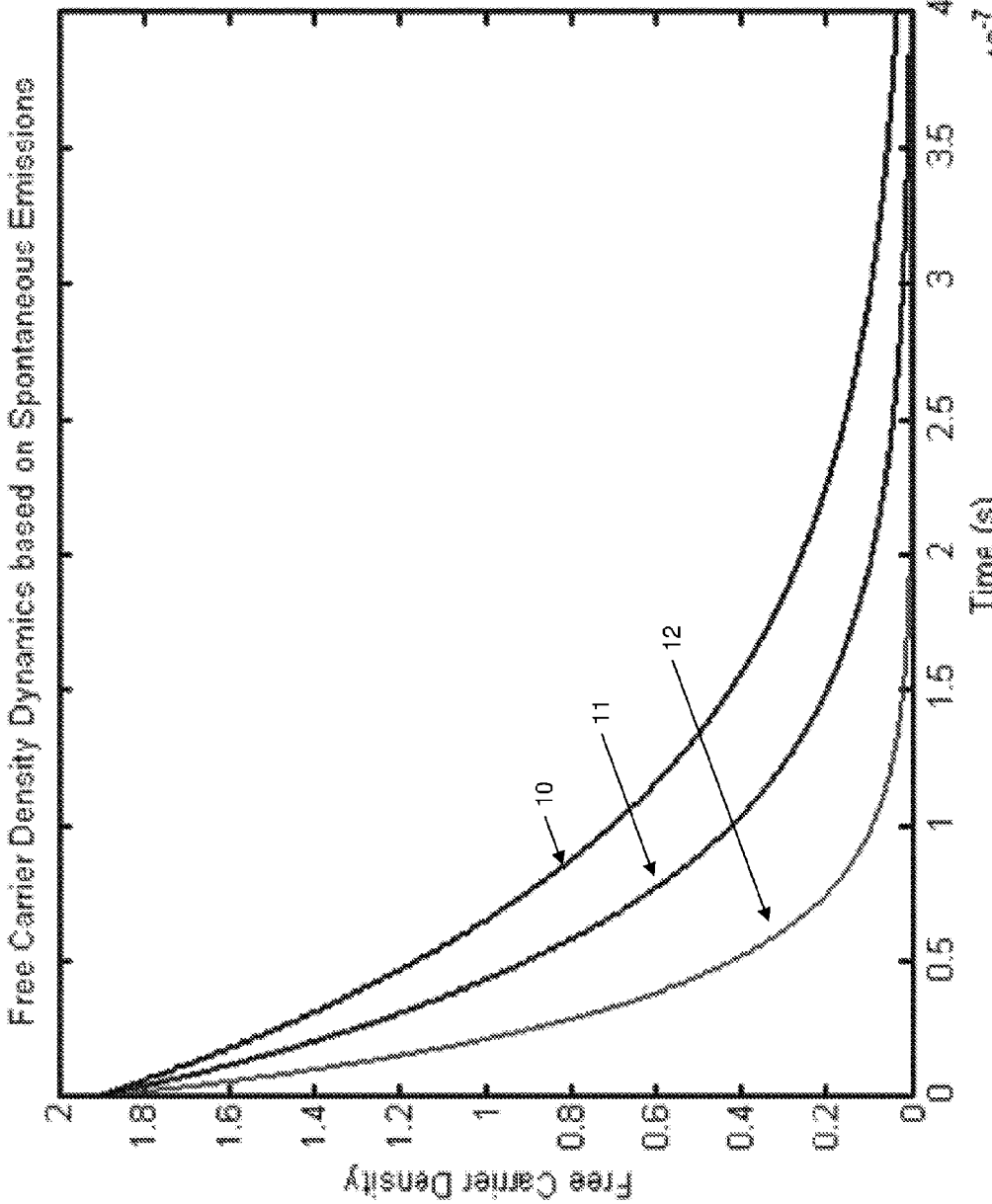
FIG. 2 illustrates a graph comparing spontaneous emission, with stimulated emission with pump powers of 1 mW and 2 mW.

This equation is plotted in FIG. 2 over time for pump powers of 1 mW 11 and 2 mW 12. For comparison, the spontaneous emission curve 10 is also plotted.

FIG. 2 shows that the rate of stimulated emission increases with optical pump power 11, 12. It shows that if stimulated emission occurs inside the optical device, the free carrier lifetime can be reduced, resulting in faster tuning performances. This analysis can be used to validate a dual pumping structure, where the first pump emits photons of energy that induces high absorption rates, and the second pump emits photons of energy which induces high stimulated emission rates. The need for this structure arises from the indirect band gap structure of the silicon material, where the excited free carriers quickly decay to the bottom of the conduction band after excitation. This means that in order for the optical pump to induce stimulated emissions, its emitted photons can be of less energy when compared to the first pump. This change in pump energy (E) is achieved by changing the operating frequency of the pump source, in a relationship governed by E=v, where v is the operating frequency of the pump source.

The preferred embodiments provide a new tuning method which provides a technique to achieve stimulated emission of free carriers, based on carrier injection, using dual pumps. The design consists of two propagating optical pump beams, in which one pump stimulates the excitation of free carriers, and the second pump stimulates the decay of free carriers. This solves the problem of lengthy free carrier lifetimes, and consequently improves the tuning performance of integrated optical circuits such as optical switches, modulators and delay lines.

It is possible to stimulate emission within both direct and indirect band gap materials via incident photons. Depending on the impurity level of indirect band gap materials, one can either stimulate the emission from the bottom of the conduction band, or from the recombination centre. Different material impurities will have different carrier lifetimes at the recombination centre, and this should be taken into account when implementing this design on a particular material.

A number of different embodiments are possible. These can include:

Unidirectional waveguide pumping design: Turning to FIG. 3, there is illustrated a first design 30, based on coupling the pump signals from pumps 31, 32 to an optical integrated circuit component 34 or its surrounding material from the same input waveguide or input port. The second pump is additionally sent through a delay line 33, in order to adjust the pulse timing and also insure stimulated emissions occurs for the part of the spectrum limited by the free carrier lifetime. A controlled probe signal 35 can be directed through the integrated circuit in either the same or different directions relative to the pump signals.

FIG. 4 illustrates a similar arrangement 40 to FIG. 3, with the probe signal 41 inserted in a different direction to FIG. 3.

Figure 5:
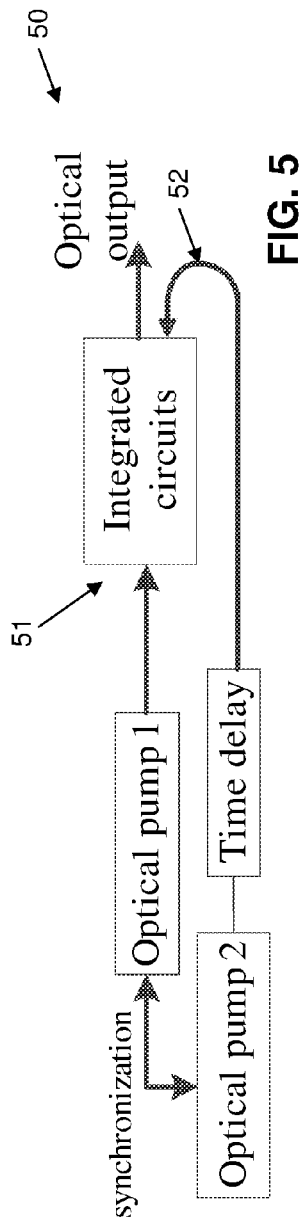
FIG. 5 illustrates schematically a Bidirectional Waveguide Pumping Control Scheme.

Different pumping signals are also available. For example, a bidirectional waveguide pumping scheme is illustrated 50 in FIG. 5, with the two pump signals 51, 52 coupled to the optical integrated circuit component or its surrounding material from different input waveguides or input ports in opposed directions.

Figure 6:
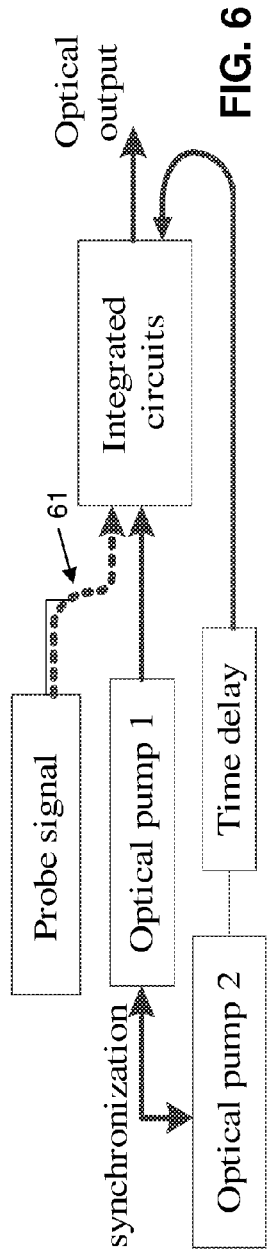
FIG. 6 illustrates schematically an alternative waveguide pumping control scheme.
Figure 7:
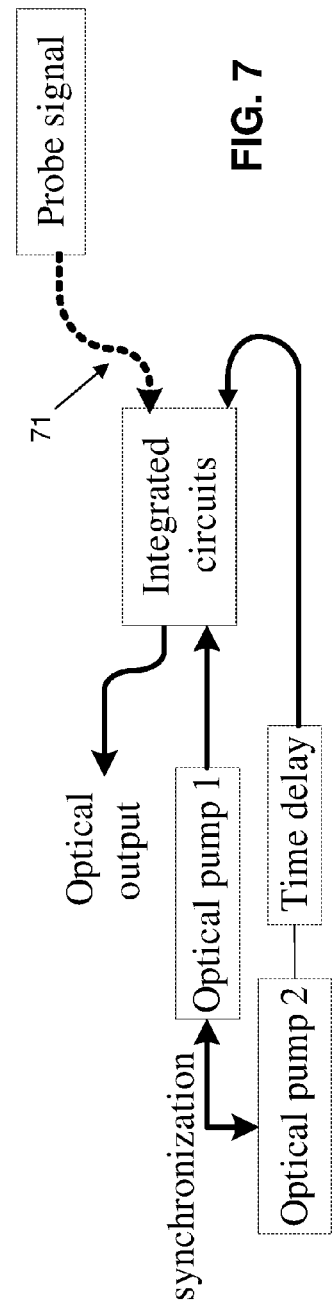
FIG. 7 illustrates schematically an alternative waveguide pumping control scheme.

The probe signal can be launched into the integrated circuit in either the same or different directions relative to the pump signals. FIG. 6 illustrates a Bidirectional Waveguide Pumping Scheme with the Probe Signal Coupling to the Same Port as Pump 1, and FIG. 7 illustrates a Bidirectional Waveguide Pumping Scheme with the Probe Signal Coupling to the Same Port as Pump 2

Further, different illumination schemes can be used. FIG. 8 illustrates an alternative illumination pumping scheme based on using the pump sources 81, 82 to illuminate the integrated circuit 83 or its surroundings. The pump signals can either be illuminating the circuit from above, below, the side or any combination thereof.

FIG. 9 illustrates Illumination and waveguide pumping scheme based on sending one of the pump signals 92 to the integrated circuit 94 via an input waveguide, and using the second pump 91 to illuminate the device. The waveguide or illumination pump can be either the absorption or stimulated emission pumps, providing that both the absorption and stimulated emission pumps are being implemented in the design.

Figure 10:
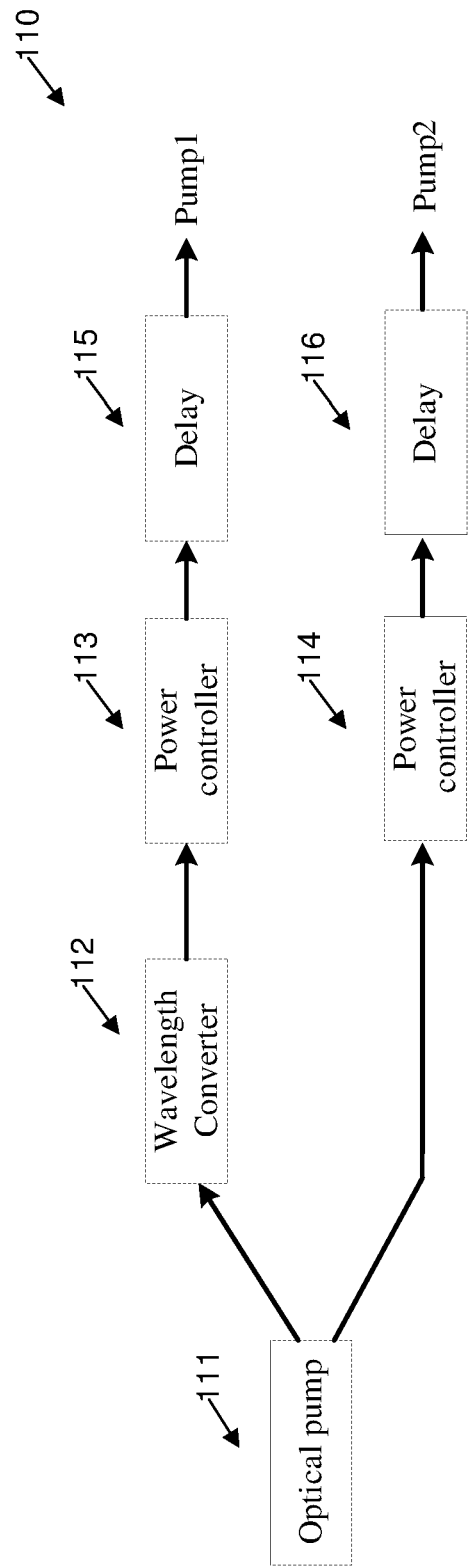
FIG. 10 illustrates schematically a Wavelength Conversion Pumping Scheme.

FIG. 10 illustrates a dual pump implementation structure 110. Here, the signal from a single optical pump source 111 is split into two paths, where the first path functions as the absorption pump, and the second path functions as the stimulated emission pump. Wavelength conversion 112 can be used to maximise the absorption/stimulated emission rates of the respective pumps. An optical amplifier/attenuator 113, 114 can be used in one or both paths to vary the optical power between the two signals. Optical delay lines 115, 116 can also be used in one or both of the arms for synchronisation purposes. The proposed pump design can be used to replace the two optical pump sources in all presented designs.

Pulse shaping using both the dual and single pump structures, whereby the modulated optical pump pulse can cause higher rates of stimulated emission. Pump pulse modulation can be achieved by using linear filters, such as a finite-impulse-response (FIR) filter where the pump pulse undergoes several optical taps, each encountering differing delays and magnitude alterations before being combined at the output. The pump pulse modulation scheme can be applied to all presented designs. FIG. 11 shows a single pump shaping scheme and FIG. 12 shows a dual pump pulse modulation scheme. The multiple taps can also be achieved by using multiple laser sources, where the combination of multiple pump sources achieve a particular pulse spectrum.

Applications

FIG. 13 illustrates a first design of an all optical modulator that can be achieved by controlling the modulation of a probe signal in a dual pump structure. The probe 134 and the pump signals 132, 133 are combined and coupled into a ring resonator 131. Based on the free carrier variations induced by the pump signals, the optical path length, or equivalently, the phase delay of the probe signal propagating through the ring resonator 131 will differ, resulting in either constructive or deconstructive interference at the output. The dual pump structure modulates the probe signal faster than current tuning methods, and either turns it on or off at the output (or any magnitude in-between).

FIG. 14 illustrates an optical switch design 140 based on using a ring resonator 141 in an add/drop filter configuration, where the probe signal 142 can either be switched to the through port 143 or the drop port 144 based on the carrier density. If the probes round trip phase shift is an integer multiple of $2\pi$, constructive interference will occur and the signal will be switched to the drop port. Otherwise, if the probe signal is an integer multiple of $\pi$, deconstructive interference will occur and the probe signal will be switch to the through port.

It can be seen that the preferred embodiments provide a system and method for the rapid response of an optical system utilising two pumping frequencies. One for inducing photon absorption in a material and the second for inducing stimulated photon emission.

Simulation Results

In addition to other experiments, computer simulations were conducted in order to validate the dual pump design. The VPI Photonics Transmission and Component Maker software was used to provide a platform on which non-linear optical waveguides can be simulated by applying formulas associated to the Two-Photon-Absorption simulations.

Figure 15:
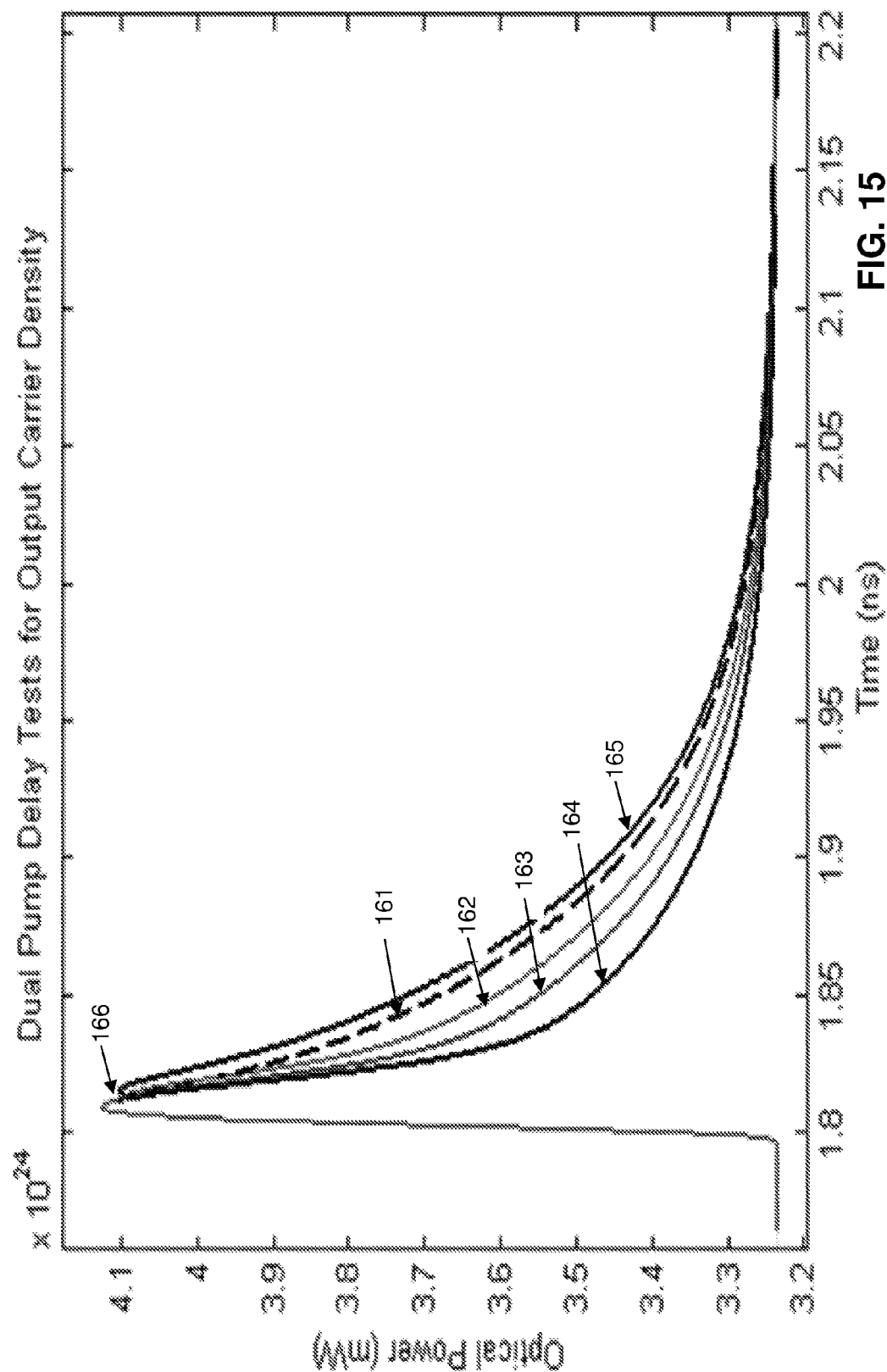
FIG. 15 illustrates a graph of dual pumping at different frequencies.

FIG. 15 illustrates the results of the simulation for a single pump structure response (161), and the dual pump structure response for differing values of frequency for the carrier density output. An all-pass filter using a single ring resonator was used as a testing circuit in the simulation. The frequencies tested include 133 THz (165), 132.99 THz (163) 132.98 THz (164) and 132.97 THz (162).

The plot highlights the effect of frequency variations of the second pump. The second peak 166 occurs as a result of the instantaneous pump power being too high, resulting in an increased probability of absorption. This high intensity is as a result of the pump signal approaching a resonate wavelength.

Figure 16:
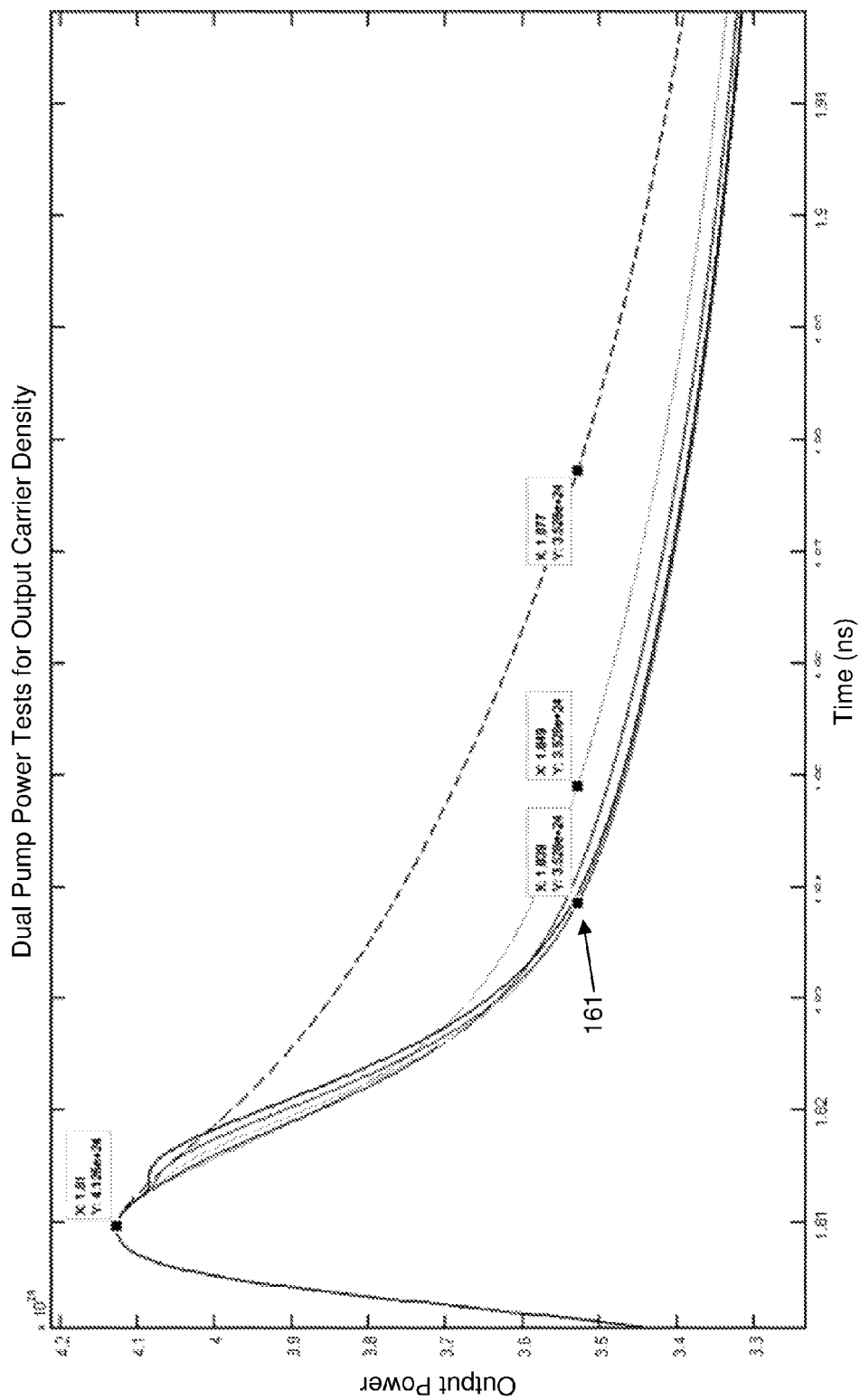
FIG. 16 illustrates a graph of the Dual Pumping Simulation results shown for various different Pump 2 frequencies.

The results are presented in FIG. 16, showing a different time scale and highlighting to date a best speed improvement achieved 161 via the addition of data points. These points are used to calculate the improvement in the tuning performance. The tuning time for the different curves to decay to a free carrier magnitude of $3.528\times10^{24}$ was measured for the different plots. A calculation was carried out to determine the speed improvement of the dual pump design. Calculation results show the single pump tuning speed, dual pump tuning speed are 67 ps and 29 ps respectively indicating a significant tuning speed improvement.

A further simulation was carried out utilising the main non-linear waveguide component parameters as set out in the table below:

| Parameter | Value | Unit |
| --- | --- | --- |
| Waveguide Length | $4.81935 \times 10^{-5}$ | M |
| Waveguide Effective Index | 2 | |
| Kerr Coefficient | 0 | $m^2/W$ |
| Two Photon Absorption Coefficient | $10^{-9}$ | m/W |
| Recombination Process | LINEAR | |
| Gain Model | LOGARITHMIC | |
| Gain Shape | PARABOLIC | |
| Peak Gain Frequency | $132.99 \times 10^{12}$ | Hz |
| Gain Bandwidth | $0.1 \times 10^{12}$ | Hz |
| Initial Carrier Density | $1 \times 10^{24}$ | $m^{-3}$ |

Figure 17:
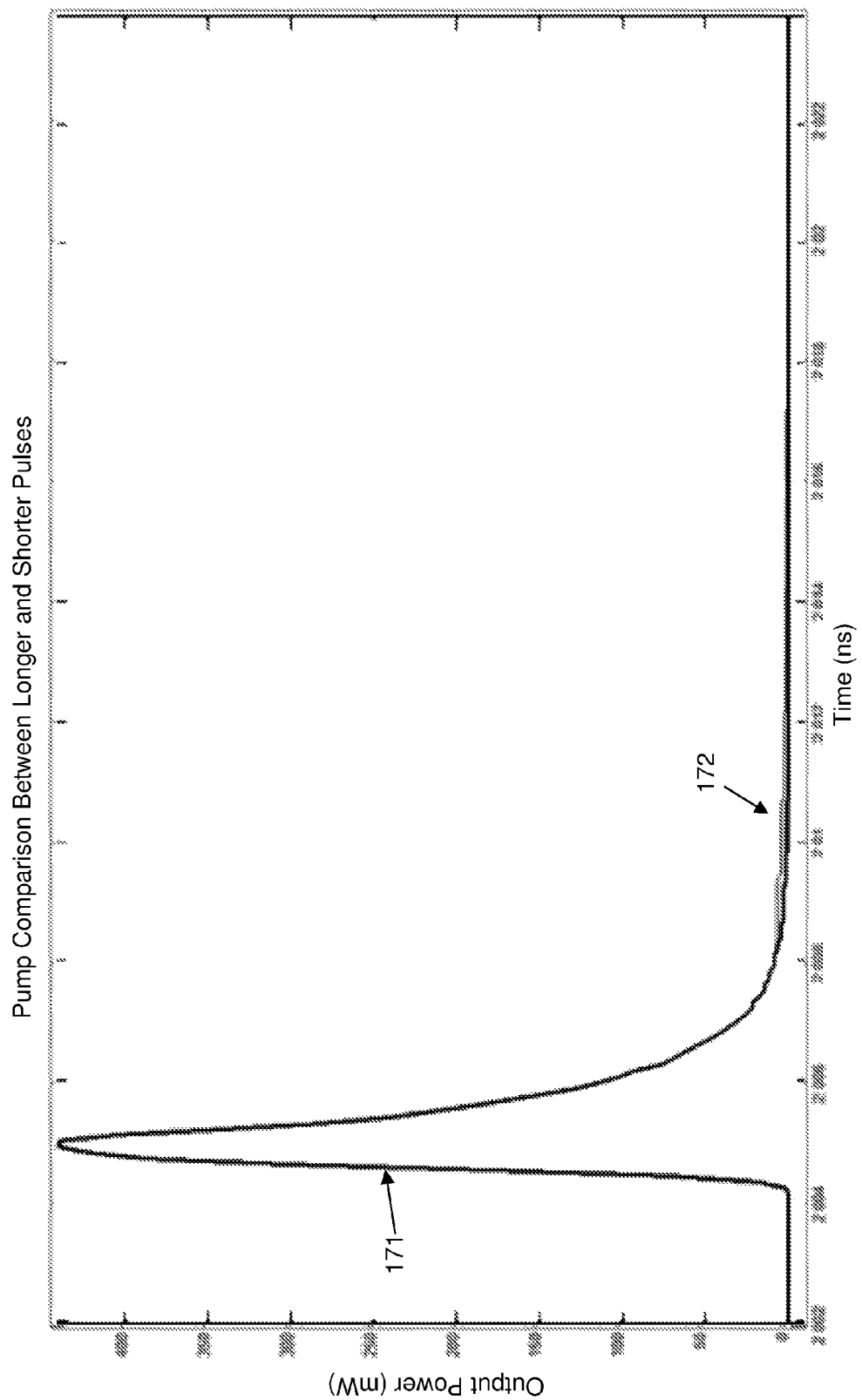
FIG. 17 illustrates a Schematic Diagram for the Single Pump Modulation Tests

The effect of different pulse duration was tested, in order to test the hypothesis that pump pulses of longer and low magnitude tails will lead to faster tuning dynamics by way of higher stimulated emission rates. This concept was investigated on both the single and dual pump designs. To test whether modulating the pump signal has any influence on the tuning performance, both the single pump and the dual pump structures were tested with pulse shapes mimicking the natural decay rate of exited free carriers. The pump signal was as illustrated in FIG. 17, with a pulse shape denoted 171. The tail of this pulse shape was also then slightly extended 172 in order to see if this will cause more stimulated emissions. FIG. 17 compares the two pulse shapes used in the simulation, where a second curve 171 being a slightly lengthened version of the curve 172.

Figure 18:
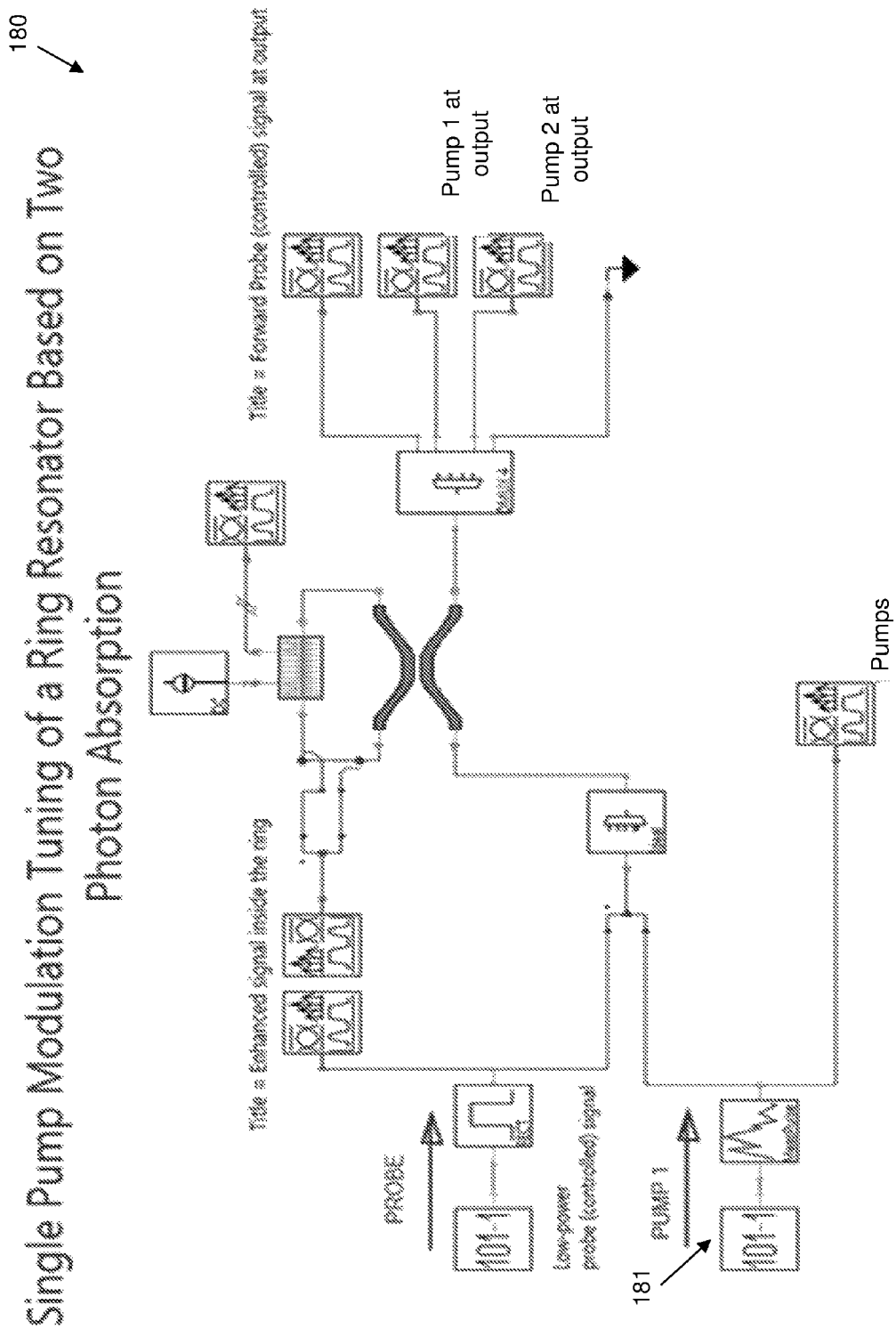
FIG. 18 a schematic block diagram of the layout of a Single Pump Modulation Test.

FIG. 18 illustrates a schematic diagram 180 of the components used to simulate the single pump modulation design in the VPI software. The emission frequency of pump 1 (181) is 193.09 THz.

Figure 19:
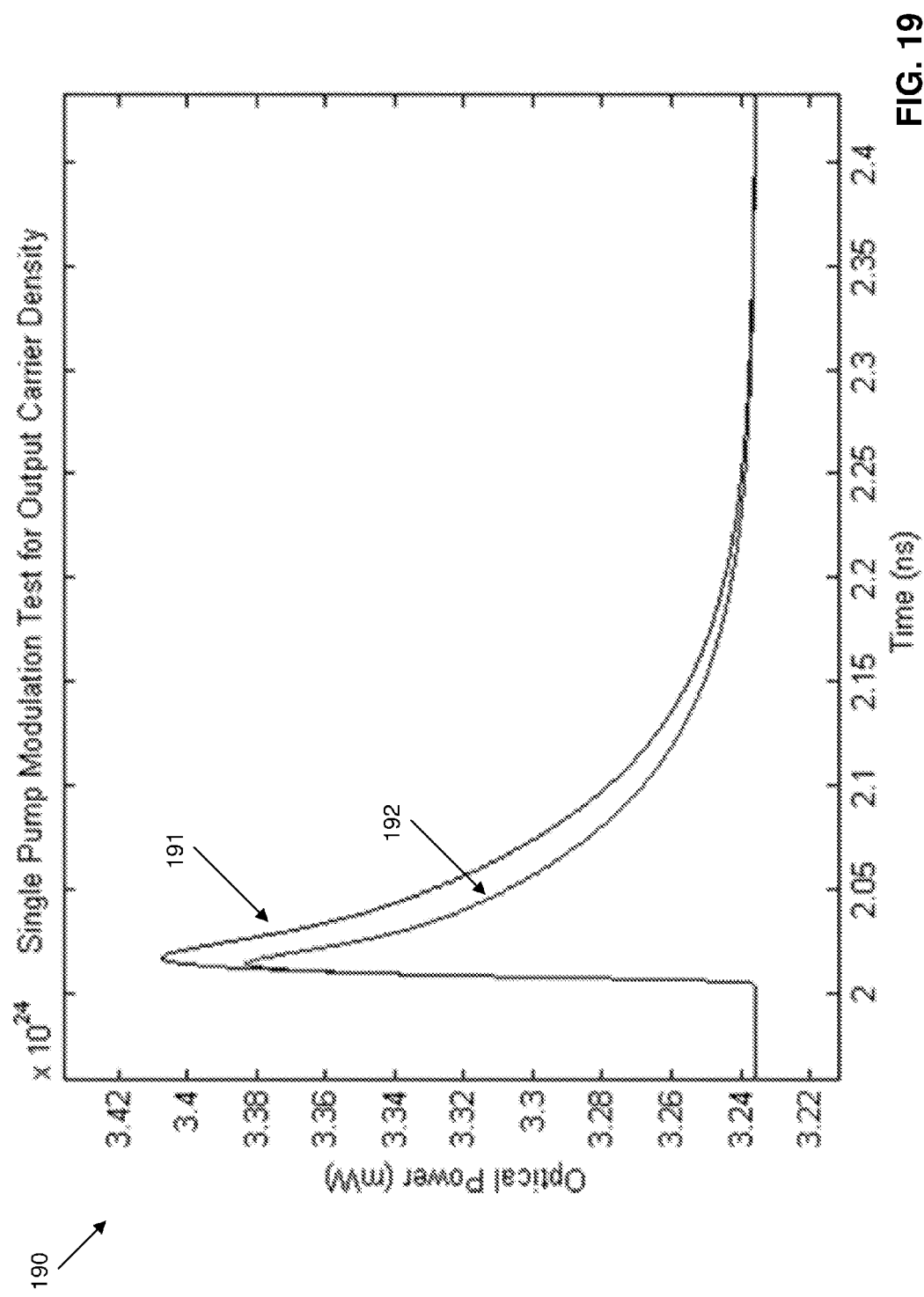
FIG. 19 illustrates the Single Pump Modulation Test for carrier density output.

FIG. 19 illustrates the tuning performance 190 for the output carrier density for the single pump design, where the curve 191 corresponds to the longer modulated pump signal, and the curve 192 corresponds to the shorter modulated pump signal.

Figure 20:
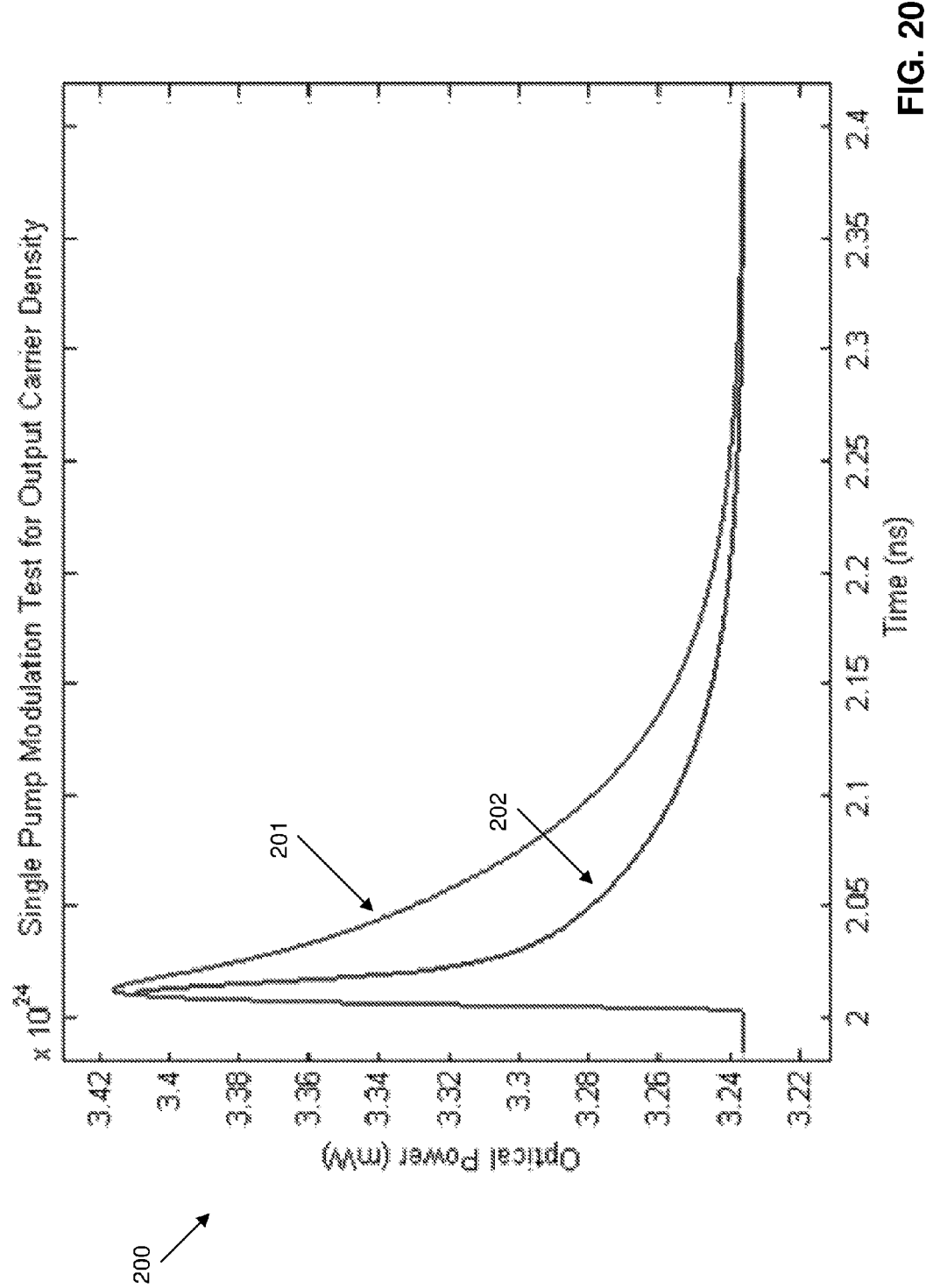
FIG. 20 illustrates the Single Pump Modulation Test for Carrier Density Output using a pump frequency of 132.98 THz.

FIG. 20 illustrates that the longer modulated signal induces slower tuning performances. This is thought to occur because the extended tail of the longer signal is being absorbed to cause stimulated emissions. The absorption process is occurring at a higher probability in this scenario because the excited free carriers are decaying to lower energy values in the conduction band, and thus, population inversion is not achieved for the higher energy region corresponding to the incident pump photon energy.

It is theorised that higher rates of stimulated emission can occur if the dual pumping structure is used, where the pump inducing stimulated emission can have its photon energies design to be equivalent to the band gap energy. This concept was tested via simulations.

It is also theorised that changing the frequency of pump 1 (181, FIG. 18) to 132.98 THz may also improve the rates of stimulated emission, as this will result in the incident photons having an energy equal to the band gap energy. However, this may render the initial absorption process more difficult, as the free carriers will need to additionally absorb a phonon in order to enter the higher energy state. The previous simulation was repeated for this new frequency value, for both the longer and shorter pump spectrums. FIG. 20 illustrate the carrier density output spectrum, with the curve 201 illustrating the longer modulated pulse and the curve 202 illustrating the shorter modulated pulse.

The result of FIG. 20 show that the slightly longer pump pulse caused a substantial improvement in the tuning performance of the design, highlighting that is it possible for the tail of the single pump design to stimulate the emission of free carriers. However, it also shows that the peak carrier density magnitude for the longer modulated pump signal occurs earlier in time, and has a smaller peak magnitude when compared to the shorter pulse.

This is thought to occur because the tail of the pulse is already causing some stimulated emissions before the peak carrier density value has been reached. This may be a problem if the higher peak carrier density magnitude was required, in order to induce a particular resonate shift.

Figure 21:
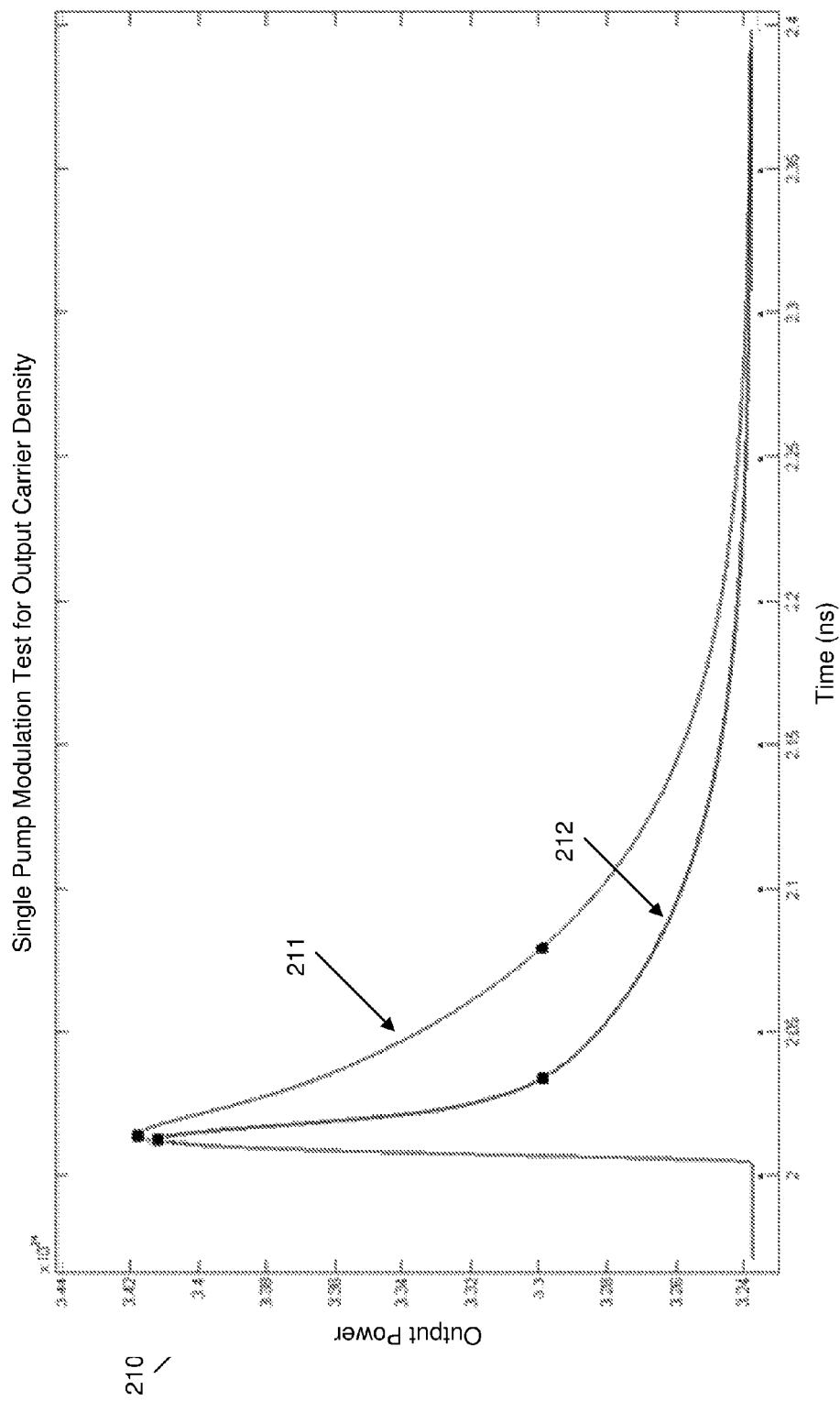
FIG. 21 illustrates the Single Pump Modulation Test for Carrier Density Output using a pump frequency of 132.98 THz showing the data points used for calculations.

FIG. 21 illustrates a screenshot 210 of the tuning measurements taken for the above design. The measurements were used in the calculations to establish a speed improvement of the design.

The tuning performance of the shorter tailed pump pulse 212 is calculated as 0.066 ns The tuning performance of the longer tailed pump pulse 211 is calculated as 0.021 ns Thus, The overall speed improvement of the modulated signal, comparing the longer and shorter tailed pulses is calculated as 3.19

This highlights that by modulating the single pump power spectrum to have a longer tail can yield tuning performances which is more than 3 times faster when compared to pump power spectrums having shorter tails.

Dual Pump Modulation Test

To prevent the reduction in peak free carrier magnitude event in the single pump modulation simulation, a dual pumping structure was tested, where the delay of the second pump can be precisely controlled, limiting the stimulated emission process to the switching off of part of the spectrum.

Figure 22:
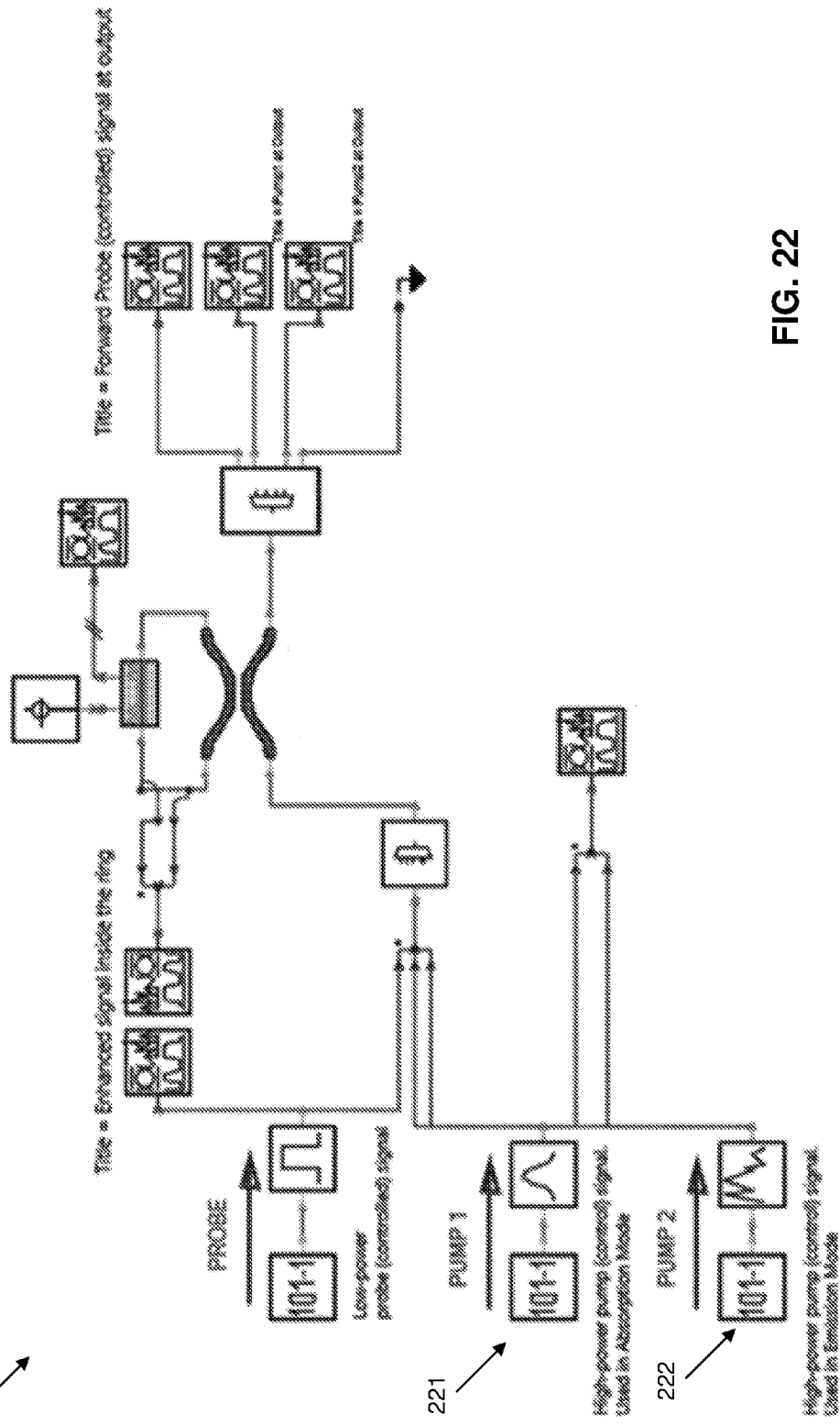
FIG. 22 illustrates a Schematic for Dual Pump tuning of a ring resonator based on two photon absorption.

FIG. 22 illustrates the dual pump arrangement 220, with first 221 and second 222 pump signals being provided. The emission frequency of the second pump 222 was 132.98 THz.

Figure 23:
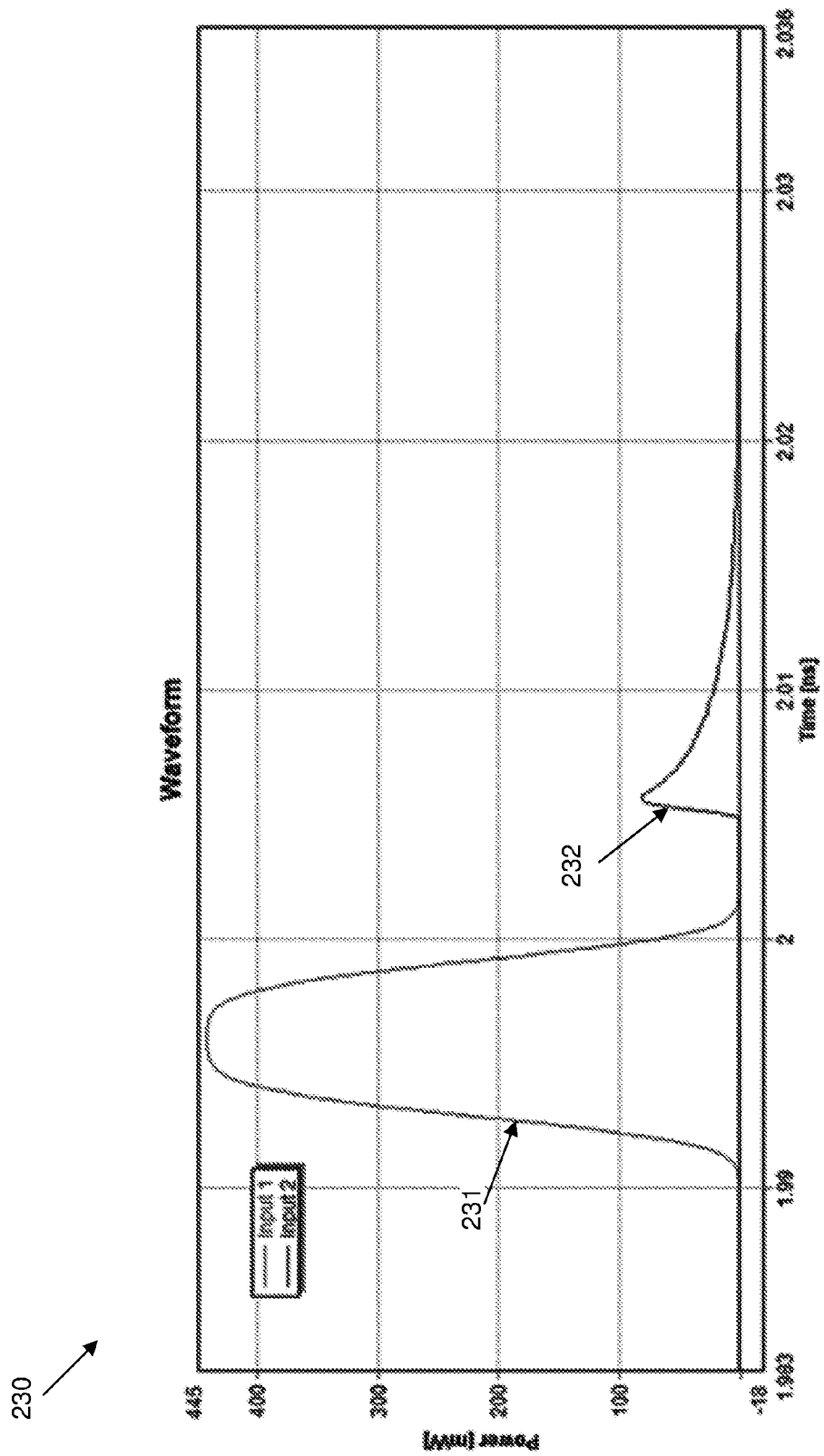
FIG. 23 illustrates the power spectrum for the Dual Pump Modulation Test.

FIG. 23 illustrates the pulse spectrums used for pump 1 (231) and pump 2 (232), highlighting the different pulse shapes used in the simulation.

Figure 24:
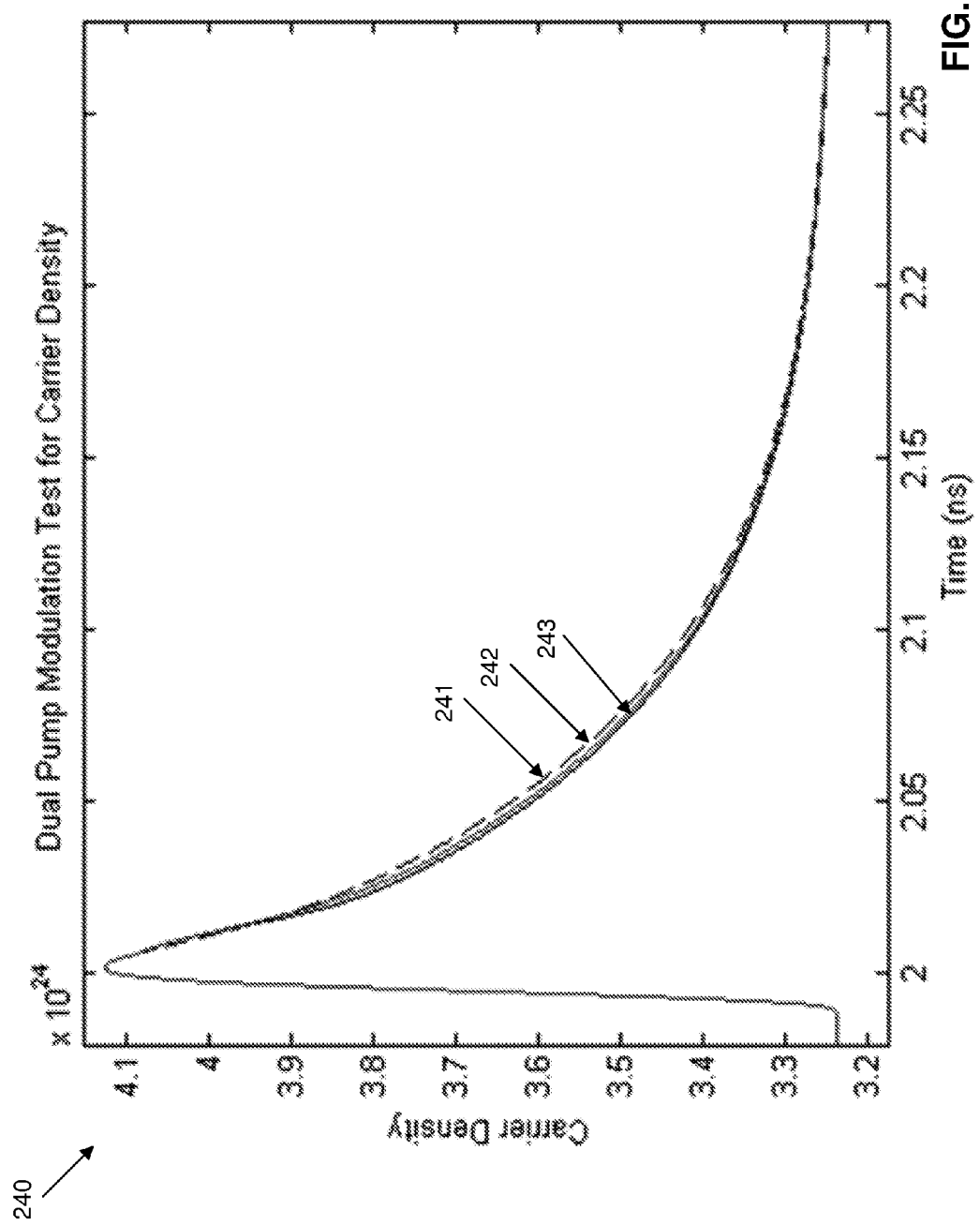
FIG. 24 illustrates the Dual Pump Modulation Test for Carrier Density.

FIG. 24 illustrates the tuning performance 240 of the design for the carrier density output, where the dashed line 241 corresponds to the single pump tuning method, and the line 242 corresponds to the shorter modulated pump signals and the line 243 corresponds to the longer modulated pump signals. FIG. 24 illustrates that the longer modulating signal 243 of Pump 2 is causing higher rates stimulated emission, resulting in a faster tuning performance. This is thought to occur because the longer tail of the pump pulse 243 results in the presentation of more incident photons when compared to the shorter pulse 242. This leads to higher rates of stimulated emission. Therefore, by optimising the pump pulse shape, higher rates of stimulated emission can be achieved over a larger range of the carrier density spectrum.

Fiber Bragg Grating Filter Embodiment

Figure 25:
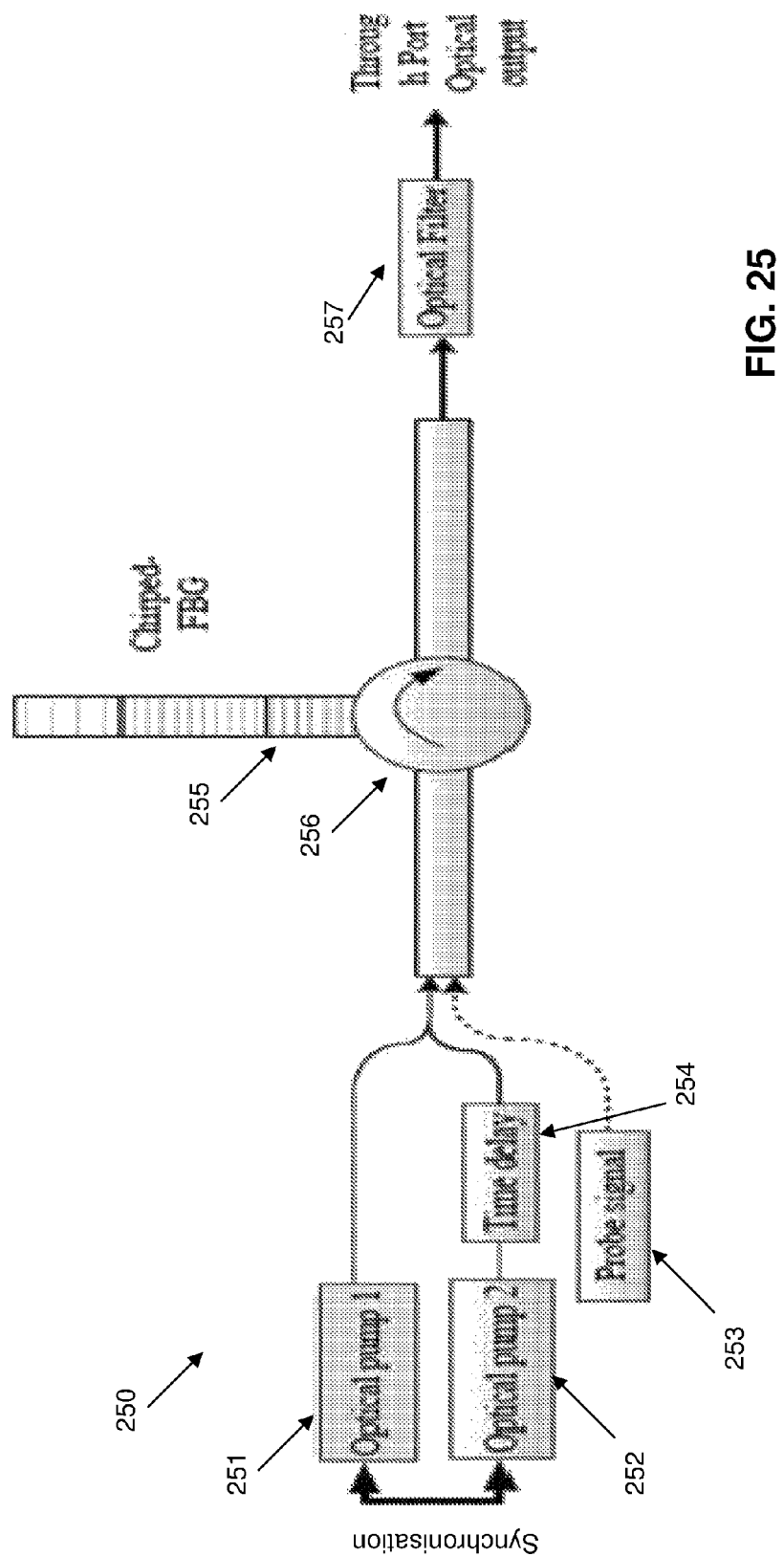
FIG. 25 illustrates a Fibre Bragg Grating Structure using a Dual Pumping Structure.

Based on using the dual pumping structure arrangement an alternative design is to utilise a Fibre Bragg Grating. FIG. 25 illustrates one such arrangement 250. The outputs from two optical pumps 251, 252 is time delayed 254 before being fed through circulator 256. At one port of the circulator is attached a fiber Bragg grating (FBG) 255. The FBG 255 provides the correct output spectrum of a filter.

Generating free carriers will red shift the filter spectrum, while stimulating the decay of free carriers will blue shift the filter spectrum. An optical filter 257 is used at the output of the circulator to filter out the remaining pump signals from the output spectrum. This design can also be used to generate a real time optical Fourier transform.

INTERPRETATION

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or optical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. An optical processing system providing a rapid optical response, the system including:
   a first optical material sensitive to an effective refractive index change under photon absorption;
   a first optical pump for optically pumping said first optical material at a first frequency so as to cause the first optical material to undergo an effective refractive index change by means of photon absorption;
   a second optical pump for optically pumping said first optical material at a second frequency so as to cause the first optical material to undergo a rapid second effective refractive index change by means of stimulated emission.

2. A system as claimed in claim 1 wherein said first optical material forms part of an integrated circuits, and wherein said optical pumps act to control the resonant frequencies of operation of the integrated circuits.

3. A system as claimed in claim 1 further comprising:
   an optical probe signal input, input to said first optical material, with said first optical material acting to filter said optical probe signal input to produce an optical output signal.

4. A system as claimed in claim 1 wherein at least one of said optical pumps is interconnected to said optical material by means of a waveguide.

5. A system as claimed in claim 1 wherein at least one of said optical pumps projects its optical output to said optical material by means of free space projection.

6. A system as claimed in claim 1 wherein the output of at least one of said optical pumps undergoes intermediate frequency conversion before being projected through said first optical material.

7. A system as claimed in claim 1 wherein the output of at least one of said output pumps is filtered before being projected through said first optical material.

8. A system as claimed in claim 1 wherein the pump decay of the second optical pump is modulated to increase the speed of stimulated emission.

9. A system as claimed in claim 8 wherein the length of the pump decay is increased.

10. A system as claimed in claim 1 further comprising:
    a relative delay element wherein the first and second optical pump are connected to a relative delay element so as to provide a fixed delay between the first and second pumping.

11. A system as claimed in claim 10 wherein said relative delay element comprises a fiber Bragg grating.

12. A method of controlling the rate response of an optically tuned system, the method including the steps of:
    (a) providing a first optical material sensitive to an effective refractive index change under stimulated emission;
    (b) pumping the first optical material with a first pump frequency to induce an effective refractive index change due to optical absorption;
    (c) pumping the first optical material with a second pump frequency to induce a rapid change in the effective refractive index of the first optical material by stimulated emission.

13. A method as claimed in claim 12 further comprising the step of:

(d) projecting an optical probe signal through said first optical material, and said first optical material acting to filter said optical probe signal in accordance with a current effective refractive index state of said optical material.

* * * * *